PRESET CIRCUIT FOR A SOLID STATE MAGNETIC OSCILLATOR
Filed Nov. 14, 1962
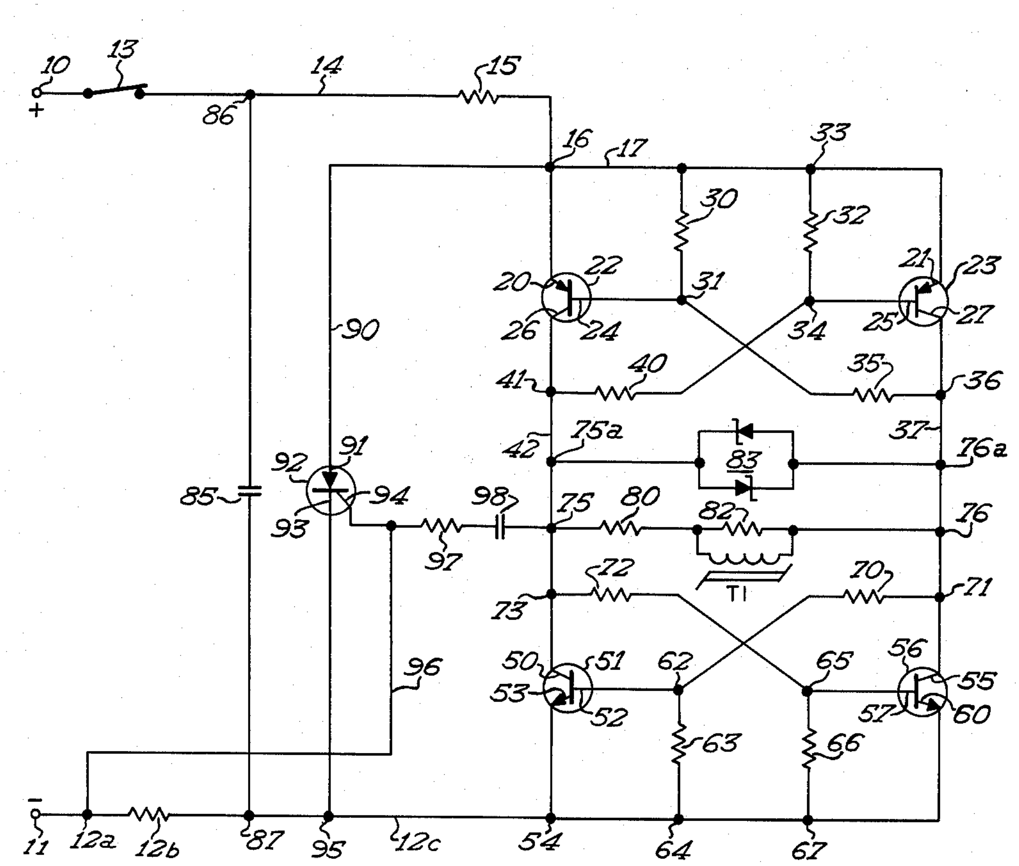
INVENTOR.
ROMAN C. RUHLAND
BY
Omund R. Dahle
ATTORNEY 3,225,311

PRESET CIRCUIT FOR A SOLID STATE MAGNETIC OSCILLATOR

Roman C. Ruhland, Minneapolis, Minn., assignor to Honeywell Inc., a corporation of Delaware Filed Nov. 14, 1962, Ser. No. 237,550
6 Claims. (Cl. 331—113)

This invention relates to solid-state magnetic oscillators and more specifically relates to improved apparatus for presetting the flux of the square loop magnetic core of the solid-state magnetic oscillator timer circuit when the power is removed therefrom.

In a magnetic oscillator which utilizes a volt-second integration principle for establishing the time base, the magnetic core used is one having a substantially rectangular hysteresis loop material. In such an oscillator, the magnetic core is driven sequentially from one state of saturation to the other, with a complete cycle of oscillation being obtained each time the magnetic core is caused to traverse its entire hysteresis loop. In this type of timer circuit, no energy is stored in the core and for this reason when power to the magnetic oscillator is withdrawn, the oscillation is stopped immediately. Thus, depending upon the instant of power shutoff, the magnetic state of the core may be at any point of the hysteresis loop of the core. Upon the reapplication of power to the magnetic oscillator, the first cycle of operation begins substantially at the exact point on the hysteresis loop of the core where power was removed on the previous operation. Under most conditions it will result in a fractional initial cycle being generated. In precision timers where the required timing increments range from milliseconds to seconds, it is essential that the first oscillation starts at the exact beginning of a cycle, and a haphazard starting of the oscillator cannot be tolerated. This is especially true where the time period of one cycle or the sum of time periods of a number of cycles are used to control the occurrence of events, such as in counters.

An object of this invention is to provide an improved solid-state magnetic core oscillator timer circuit having means to insure that the initial cycle of operation is a complete cycle.

Another object of this invention is to provide in a solid-state magnetic oscillator apparatus for presetting the magnetic core to a specific point on its hysteresis loop upon the removal of power from the oscillator.

These and other objects of the invention will be more apparent upon a consideration of the specification, claims and drawing of which:

The figure is a schematic drawing of the circuit of a preferred embodiment of this invention.

Referring now to the drawing, a pair of input terminals 10 and 11 are connected across a suitable source of direct current potential with the terminal 10 being positive with respect to terminal 11. Terminal 11 is connected to a common negative lead 12*c* by a resistance 12*b* while the positive terminal 10 is connected through a power switch 13, a conductor 14, a current limiting impedance 15 to a junction 16 on a conductor 17. Power switch 13 may be an electronic switch if desired.

Conductor 17 is directly connected to a pair of emitter electrodes 20 and 21 of a pair of semiconductor current control devices 22 and 23, which are herein disclosed as being pnp type transistors. Transistors 22 and 23 also include, respectively, base electrodes 24 and 25 and collector electrodes 26 and 27. A biasing resistor 30 is connected between the conductor 17 and a junction 31, which junction 31 is directly connected to base 24. Similarly, a resistor 32 is connected from the conductor 17 to a junction 34, which junction 34 is directly connected to base 25. Base 24 of transistor 22 is also cross-coupled to the collector electrode 27 of transistor 23 through a path which includes the junction 31, a cross-coupling resistor 35, and a junction 36 on a conductor 37 which is directly connected to collector 27. The base electrode 25 of transistor 23 is similarly cross-coupled to the collector electrode 26 of transistor 22 through a path which may be traced from base 25 and junction 34 through a cross-coupling resistor 40 and a junction 41 on a conductor 42 which is directly connected to collector electrode 26. The transistors 22 and 23 together with the associated components above described form a first bistable switching circuit.

A second bistable circuit which is very similar to the above described bistable circuit includes a further pair of semiconductor current control devices 51 and 56 and this circuit will now be described. The conductor 42 is directly connected to a collector electrode 50 of an npn junction transistor 51. Transistor 51 also includes a base electrode 52 and an emitter electrode 53, the emitter electrode being directly connected to a junction 54 on the negative conductor 12*c*. Conductor 37 is directly connected to the collector electrode 55 of an npn transistor 56, which transistor also includes a base electrode 57 and an emitter electrode 60, which emitter electrode is directly connected to the negative conductor 12*c*. Base electrode 52 is connected by a junction 62 and a biasing resistor 63 to junction 64 on the conductor 12*c*. Similarly, base 57 is connected by a junction 65 and a biasing resistor 66 to a junction 67 on the conductor 12*c*. Base 52 is cross-coupled to the collector 55 by a circuit which may be traced from the base 52 through the junction 62, and a cross-coupling resistor 70 to a junction 71 on the conductor 37 and thereby to collector 55. Base 57 is likewise connected through the junction 65, and a cross-coupling resistor 72, to a junction 73 on the conductor 42 and thus to collector 50.

The above described circuit comprises primarily two bistable circuits arranged to form a bridge network. The transistors will be operated on and off in pairs to permit maximum reversible power with a minimum of waste power. A pair of terminals 75 and 76, respectively, on conductors 42 and 37 may be considered as the mid points of the bridge network. Connected across the mid points from junction 75 is a temperature compensating frequency controlling resistor 80 and a saturable timing toroid T1 to the junction 76. The timing toroid is of the saturable type having a substantially rectangular hysteresis loop. Connected in parallel with he timing toroid winding T1 is a further frequency stabilizing resistor 82. A voltage reference diode 83 is connected across the mid points of the bridge, network in parallel with the elements 80, 82 and T1. This voltage reference may take the form of a double anode zener diode or a pair of matched zener diodes connected in opposite polarity relationship to each other as shown. The zener diodes shown are of the type having a higher effective forward voltage than the zener voltage.

A capacitor 85 is connected between a junction 86 on the conductor 14 and a junction 87 on the conductor 12*c*, this capacitor storing energy for use in completing the final oscillation cycle after the power switch 13 is opened. The resistor 15 is part of the oscillating circuit and is a relatively high impedance serving as a voltage dropping resistor to provide a constant current source so that the voltage across the reference diodes 83 can be maintained at the desired value. Resistor 15 may be replaced, if desired, by a suitable current regulator to maintain the current flowing through the reference diodes at a constant value, and thus maintaining the voltage across the reference diodes at a closer tolerance.

The junction 16 is connected by a conductor 90 to the anode 91 of a SCR 92, which SCR also includes a cathode 93 and a gate or control electrode 94. The cathode 93 is directly connected to the conductor 12*c* at a junction 95. The gate electrode 94 is directly connected by a conductor 96 to the junction 12*a*. A further connection from the gate electrode 94 is through a current limiting resistor 97 and a capacitor 98 to the junction 75. The controlled rectifier 92 provides a switching function which may be synchronized with the flux reversals in the oscillator magnetic core. The resistor 12*b* provides a back-bias for the SCR 92 to prevent accidental firing whenever current is flowing into the oscillator from the power source. This back-bias disappears when the power is removed by opening the switch 13. The capacitor 98 and the resistors 97 and 15 form a differentiating network for converting the square wave oscillator output on conductor 42 to pulses which are connected to the SCR gate electrode.

In considering the operation of the circuit, the first bistable circuit and the second bistable circuit are arranged such that the transistors are on and off in pairs, that is, transistors 22 and 56 will be on or conductive when transistors 23 and 51 are off or non-conductive, and vice versa. The voltage divider network across the bridge comprising resistors 80, 82 and the timing toroid T1 together with the voltage stabilizing reference 83 make up the load for the bistable bridge network. When the core of the saturable toroid T1 is not saturated it acts as a high impedance, and the biasing and cross-coupling resistors for each of the transistors are chosen to be of a value which permits the transistors for the bridge to be biased to a point in which the transistors are fully on or saturated for load current required prior to saturation of the core of timing toroid T1.

The time base depends upon the volt-second integration of the magnetic core of timing toroid T1. This requires that a closely controlled or regulated voltage appear across conductors 42 and 37 since the time of integration of the core is inversely proportional to the voltage being applied to its windings, other factors being constant. This voltage is maintained constant by the voltage reference diodes 83.

A first half cycle of operation may be considered in which transistors 22 and 56 are conductive and a current path may be traced from the positive terminal 10 through the power switch 13, conductor 14, current limiting resistor 15, transistor 22, conductor 42, junction 75, resistor 80, toroid winding T1 and resistor 82, junction 76, transistor 56, conductor 12*c* and resistor 12*b* to negative terminal 11. The first half cycle continues until saturation occurs in the core of timing toroid T1. The impedance of winding T1 decreases at saturation tending to allow an increase in current through the path. The transistors do not have sufficient base bias current to allow an increase in output current so that the transistors come out of saturation which produces a voltage drop across the "on" transistors 22 and 56. This causes the bistable circuits to switch to their opposite mode or state of conduction thereby commencing the second half cycle of operation in which transistors 23 and 51 are conductive. The voltage is then reversed across the winding of timing toroid T1 so that it again becomes a high impedance. The second half cycle continues until saturation is reached in the reverse direction of the core of timing toroid T1 whereupon the current tends to increase through transistors 23 and 51 causing a voltage drop across these "on" transistors and causing the two bistable circuits to switch again to their original mode of operation thereby completing a cycle and commencing a new cycle of operation.

As was previously mentioned, when the power switch 13 is closed the energy storage capacitor 85 charges through the resistor 12*b* and the transient voltage appearing across the resistor 12*b* is applied as a back bias to the gate electrode of the SCR 92 to prevent it from firing on the power turn-on transient. As the magnetic core is alternately driven from one state of saturation to the other, a square wave voltage is generated at junction 75 and another at junction 76. The differentiator circuit comprising capacitor 98, resistors 97 and 15 convert this square wave to alternating positive and negative voltage spikes which are applied to the gate electrode 94 of the SCR 92. The resistor 12*b* provides a back bias for the SCR as long as current is flowing into the oscillator from the power source and therefore as long as the negative back bias is present at the SCR gate electrode, the positive signal spikes are ineffective in firing the SCR.

When the switch 13 is opened, the back bias developed across the resistor 12*b* drops to zero making it possible for the SCR to be fired. The oscillator continues to function from energy stored in the capacitor 85 until the first positive signal spike appears at the gate electrode of the SCR 92. Since this positive signal spike is generated only when the oscillator magnetic core reaches a specific state of saturation, the oscillations will be stopped only with the core in that state. In other words, the differentiated pulses occur at the points of saturation of the timing toroid when the bistable circuits are switched. The signal to the SCR is thus synchronized with reversal of flux.

The positive pulse to the gate electrode 94 fires the SCR causing it to provide a low impedance shunt across the oscillator circuit whereby the remainder of the energy stored in capacitor 85 is bypassed around the oscillator through the SCR 92, the oscillation immediately ceasing. Consequently, when power is reapplied, the first cycle of operation will always be a complete full cycle since it is started from a specific state of core saturation.

Modifications of this invention will undoubtedly occur to those who are skilled in the art and I therefore wish it to be understood that I tend to be limited by the scope of the appended claims and not by the specific embodiment which is disclosed for the purpose of illustration only.

I claim as my invention:

1. Apparatus for presetting the magnetic state of the core of a semiconductor magentic timer oscillator to a predetermined saturation point after the removal of the energizing potential therefrom, comprising:

semiconductor oscillator means including saturable core timing means energized from a source of potential;

semiconductor current control means having a control electrode and a pair of output electrodes said current control means having a normally non-conductive state and being operative by a suitable signal to low impedance conductive condition;

means interconnecting said output electrodes of said current control means with said oscillator means so as to provide a current path parallel with said oscillator means when said current control means is in the low impedance conductive condition;

means connecting the output signal from said oscillator means to said control electrode;

capacitor energy storage means connected in parallel with said oscillator means;

and switching means for disconnecting said source of potential from said oscillator means, whereupon said capacitor energy storage means provides sufficient potential to said oscillator means to continue oscillation therein for the remainder of the cycle until the signal output therefrom causes said semiconductor current control means to become conductive to discharge said capacitor means and quench said oscillation.

2. Apparatus for presetting the magnetic state of the core of a semiconductor magnetic timer oscillator to a predetermined saturation point after the removal of the energizing potential therefrom, comprising:

oscillator means including bistable semiconductor means and saturable core timing means adapted to be energized from a source of potential, said oscillator means providing a substantially square wave output signal;

controlled rectifier means having a gate electrode and a pair of output electrodes, said controlled rectifier normally presenting a high impedance between said output electrodes until triggered by a signal to said gate electrode to a low impedance condition between said output electrodes;

means interconnecting said output electrodes of said controlled rectifier means and said oscillator means so as to provide a current path parallel to said oscillator when said rectifier means is in the low impedance condition;

differentiating means connected to said oscillator output signal for differentiating said square wave signal to pulse type signals and applying said pulse type signals to said gate electrode;

capacitor energy storage means connected in parallel with said oscillator means;

reverse bias producing means connected to said gate electrode and responsive to application of potential to said oscillator means to provide a reverse bias on said electrode to prevent said pulse type signals triggering said controlled rectifier;

and switching means connecting said source of potential in energizing relation to said oscillator means, said capacitor means being simultaneously charged so that upon said switch means being opened to remove said source said capacitor energy storage means provides potential to maintain oscillation until said pulse type signal to said gate electrode triggers said controlled rectifier to said low impedance condition thereby discharging said capacitor means and quenching oscillation.

3. Apparatus for presetting the magnetic state of the saturable magnetic core of a semiconductor magnetic timer oscillator to a predetermined saturation point after the removal of the energizing potential therefrom, comprising:

semiconductor oscillator means including saturable core timing means energized from a source of potential, said oscillator means producing a signal upon said saturable core reaching said predetermined flux state;

semiconductor current control means having a control electrode and a pair of output electrodes, said current control means having a normally non-conductive state and being operative by a suitable signal to a low impedance conductive condition;

means interconnecting said output electrodes of said current control means and said oscillator means so as to provide a current path parallel to said oscillator means when said rectifier means is in the low impedance condition;

means connecting the output signal from said oscillator means to said control electrode;

energy storage means connected to said oscillator means;

and means for disabling said source of potential to said oscillator means, said energy storage means then providing sufficient energy therefrom to said oscillator means to continue oscillation therein until said core reaches said predetermined flux state whereupon said signal causes said semiconductor current control means to become conductive to discharge said energy storage means and quench said oscillation.

4. Apparatus for presetting the magnetic state of the core of a semiconductor magnetic timer oscillator to a predetermined saturation point, comprising:

oscillator means including bistable semiconductor means and saturable core timing means adapted to be energized from a source of potential, said oscillator means providing a substantially square wave output signal;

controlled rectifier means having a gate electrode and a pair of output electrodes, said controlled rectifier normally presenting a high impedance between said output electrodes until triggered by a signal to said gate electrode to a low impedance condition between said output electrodes;

means connected to said oscillator output signal for applying said pulse type signals to said gate electrode;

capacitor energy storage means connected to said oscillator means;

reverse bias producing means connected to said gate electrode and responsive to application of potential to said oscillator means to provied a reverse bias on said electrode to prevent said pulse type signals triggering said controlled rectifier;

means interconnecting said output electrodes of said controlled rectifier means and said capacitor energy storage means so as to provide a current path parallel to said capacitor means when said rectifier means is in the low impedance condition;

and means for disabling said source of potential to said oscillator means, said capacitor means being normally charged so that upon said disabling means being effective to disable said source, said capacitor energy storage means provides potential to maintain oscillation until said pulse type signal to said gate electrode triggers said controlled rectifier to said low impedance condition thereby discharging said capacitor means and quenching oscillation.

5. Apparatus for presetting the magnetic state of the core of a semiconductor magnetic timer oscillator to a predetermined saturation point, comprising:

oscillator means including bistable semiconductor means and saturable core timing means adapted to be energized from a source of potential, said oscillator means providing a substantially square wave output signal;

further current control means having a control terminal electrode and a pair of output terminals, said current control means normally presenting a high impedance between said output terminals until triggered by a signal to said control terminal to a low impedance condition between said output terminals;

means connected to said oscillator output signal for applying said pulse type signals to said control terminal;

capacitor energy storage means connected to said oscillator means;

means interconnecting said output electrodes of said conrtolled rectifier means and said capacitor energy storage means so as to provide a current path parallel to said capacitor means when said rectifier means is in the low impedance condition;

and means for disabling said source of potential to said oscillator means, said capacitor means being normally charged so that upon said disabling means being effective to disable said source, said capacitor energy storage means provides potential to maintain oscillation until said pulse type signal to said control terminal triggers said current control means to said low impedance condition thereby discharging said capacitor means and quenching oscillation.

6. Apparatus according to claim 1 wherein a biasing means is connected to said semiconductor current control means to normally bias said control means to said non-conductive state while said oscillator means is energized and normally oscillating.

References Cited by the Examiner

UNITED STATES PATENTS

| | | | |
|---|---|---|---|
| 2,994,788 | 8/1961 | Clark | 307—88.5 |
| 3,085,211 | 4/1963 | Jensen et al. | 331—113 |

ROY LAKE, *Primary Examiner.*

JOHN KOMINSKI, *Examiner.*